Feb. 3, 1970   R. P. BRENNER   3,493,210
RESTRAINT ASSEMBLY
Filed Feb. 19, 1968   2 Sheets-Sheet 1

INVENTOR.
RAYMOND P. BRENNER
BY
Jack C. Munro
-AGENT-

INVENTOR.
RAYMOND P. BRENNER
BY
Jack E. Munro
-AGENT-

United States Patent Office 3,493,210
Patented Feb. 3, 1970

3,493,210
RESTRAINT ASSEMBLY
Raymond P. Brenner, Whittier, Calif., assignor to McDonnell Douglas Corporation, a corporation of Maryland
Filed Feb. 19, 1968, Ser. No. 706,366
Int. Cl. B65j 1/22
U.S. Cl. 248—361                2 Claims

ABSTRACT OF THE DISCLOSURE

In a cargo handling system a pallet or container restraint assembly employed in combination with a latching assembly which latches to permit passage of the load supporting element yet does not permit load supporting element rollback.

BACKGROUND OF THE INVENTION

In the present day field of transporting of cargo, some type of apparatus needs to be used to support and retain the cargo during the movement thereof. For this purpose, a load supporting element such as a pallet or a container is frequently employed. Generally, a pallet is the substantial planar surface which is to be employed in a horizontal manner upon which the several objects of cargo are fixedly supported. A container is different from a pallet in that it also has sides and a top so that the cargo may be completely enclosed. These load supporting elements are especially adapted for retaining the cargo during transportation thereof and are also designed to make movement of the element to and from the primary transportation means as easy as possible. Usually conveyor systems which include low friction rolling devices are used to move the pallet or container into and out of the primary transportation means.

Common types of primary transportation means are vehicles such as trucks, railroads, ships and planes. This invention will be shown with respect to aircraft although its use in other transportation means is quite probable. In aircraft that are specifically designed for cargo there are fixed to the floor low frictional devices such as rollers or ball casters to facilitate the installation and removal of the load supporting elements.

It is not uncommon for a loaded pallet or container to weigh as much as five thousand pounds. The movement of so great a weight during installation and removal of the pallet or container within the vehicle can cause the vehicle to tilt slightly resulting in the cargo floor of the vehicle assuming a slightly non-level position. It is readily apparent that upon the movement of so great a weight, momentum is considerable even though the speed and the angle of inclination to the horizontal is small. As usually such pallets or containers are moved into and out of the vehicle by means of human labor, there is possibility of injury to the people within the vehicle and also there is a good possibility of causing damage to either the pallet or container and to the vehicle itself. Recently such a loaded container fell from the doorway of an airplane during the loading procedure causing a total loss to the container as well as substantial damage to the cargo contained therein.

SUMMARY OF THE INVENTION

The apparatus of this invention comprises a ratcheting pawl in combination with a locking mechanism for cargo containers or pallets. The locking mechanism for the containers or pallets is capable of being positioned in either an inoperative position or an operative position, the inoperative position being located beneath the plane of the cargo floor. It is when the locking mechanism is in the inoperative position that the ratcheting pawl of this invention functions.

The pawl is biased to extend above the plane of the cargo floor and to come in contact with the cargo pallet or container. The pawl is pivotally connected through a first pivot axis which also functions as a pivoting axis for a portion of the locking mechanism. A second pivot axis of the locking mechanism cooperates with a slot in the ratcheting pawl thereby functioning as a movement limiter. With the ratcheting pawl in the extended or operative position, and a locking mechanism in the inoperative position, a loaded pallet or container can come in contact with the pawl and ratchet the pawl such that it will permit passage of the container or pallet. However, the ratcheting action is achieved only when the pawl is moved in a single direction, that direction usually being to load the aircraft. Once the container or pallet has passed the pawl, it ratchets back to the extended position to prevent rollback of the pallet or container.

With the locking mechanism in the operative position the function of the ratcheting pawl is no longer needed and therefore is located in an inoperative position. Usually the ratcheting pawl is employed during the loading of cargo in aircraft. Once the pallet or container passes the pawl, the pawl will prevent the pallet or container from any outboard movement.

When it is desirable to unload the aircraft, the ratcheting pawl can be either displaced manually just enough to permit passage of the pallet or container thereby assuming the extended position upon passage of the load supporting element preventing rollback of a subsequent pallet or container, or the pawl may be locked in the inoperative position if desired.

One particular advantage of this invention is that it is quite useful in baggage compartments of aircraft where the vertical clearance causes the personnel to work in a crouched or kneeling position. The ratcheting pawl will restrain the pallet or container until the personnel has ample time to operate the locking mechanism.

Other objects of this invention will no doubt become apparent from the following specification taken in conjunction with the accompanying drawings. It is believed from the foregoing that several objects of this invention are apparent, other than the ones specifically described, so as to not warrant specific enumeration.

DESCRIPTION OF THE SHOWN EMBODIMENT

Figure 1:
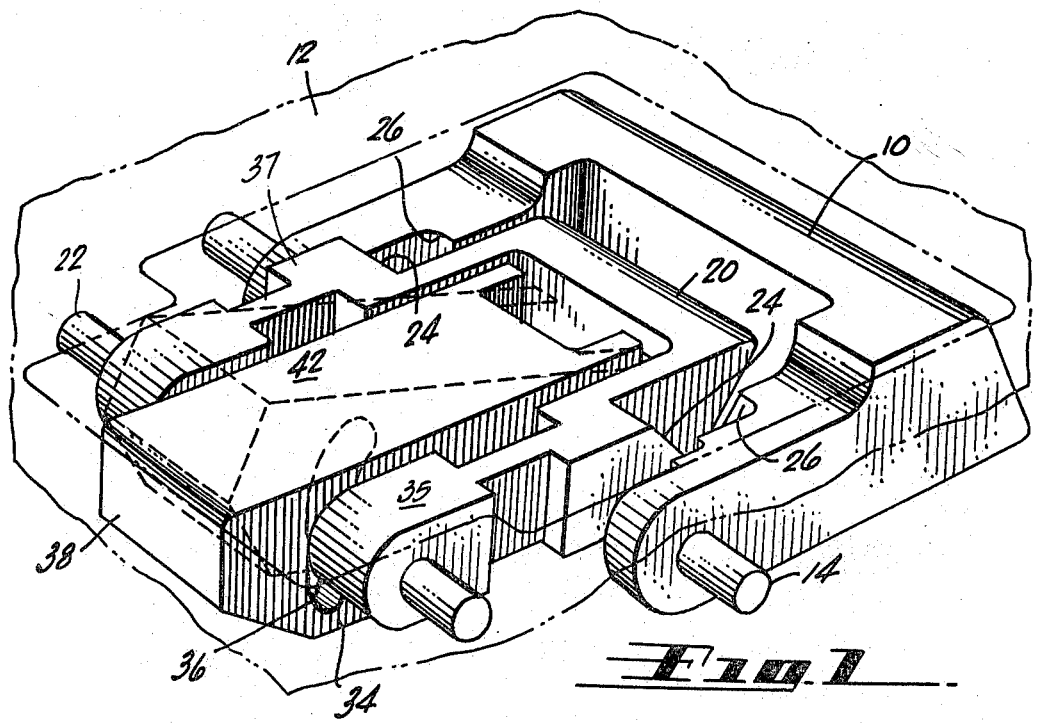
FIGURE 1 is a perspective view of the locking mechanism and ratcheting pawl of this invention showing each in the inoperative position and depicting the operative position of the ratcheting pawl in phantom.
Figure 2:
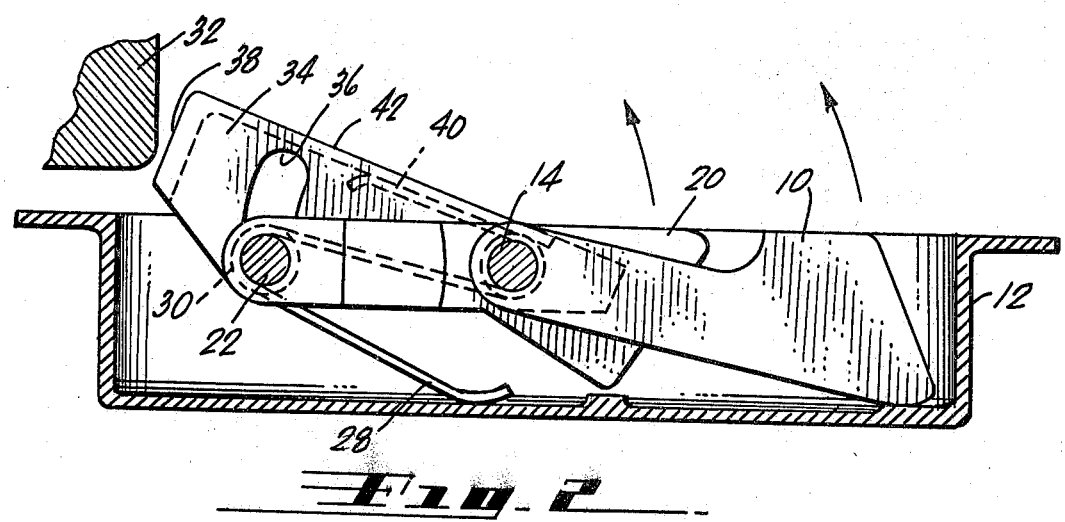
FIGURE 2 is a side view of the invention as shown in FIGURE 1 depicting the ratcheting pawl in the operative position.
Figure 3:
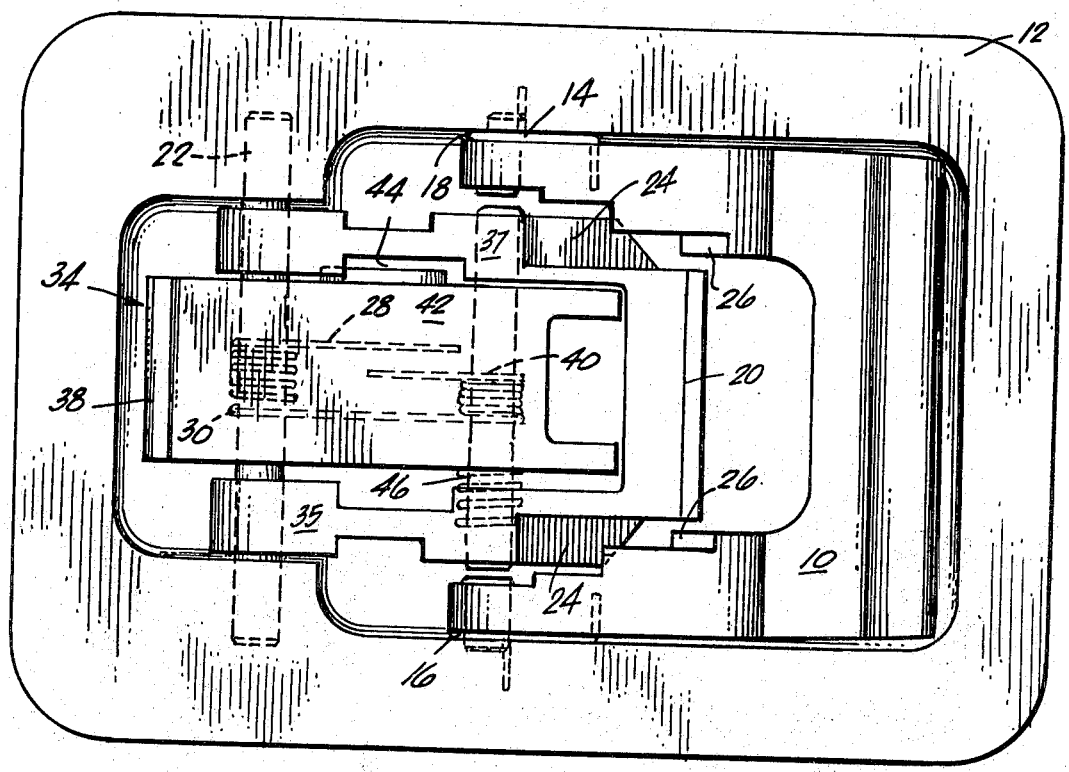
FIGURE 3 is a plan view of the invention as shown in FIGURE 2.
Figure 4:
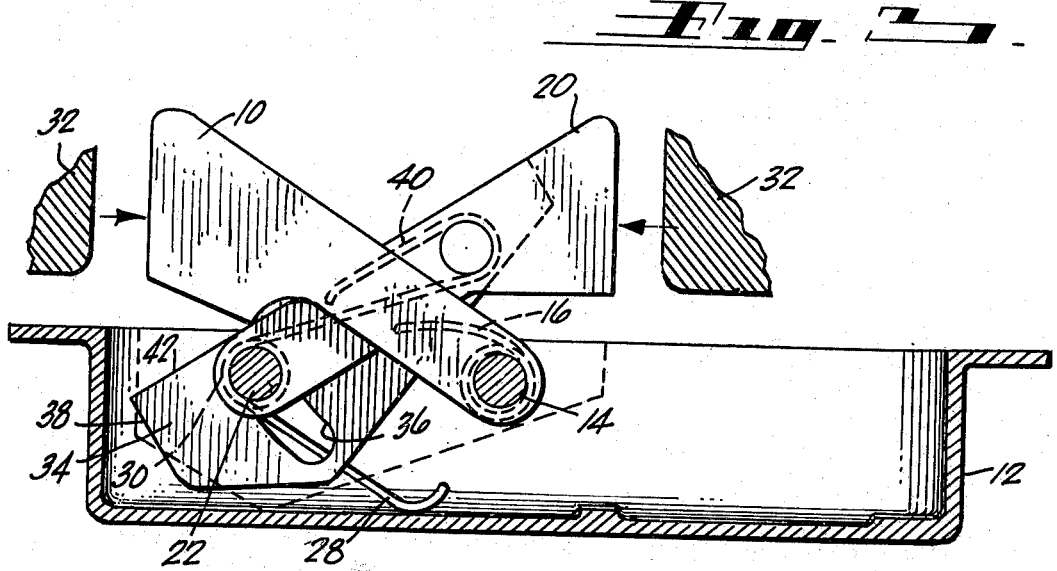
FIGURE 4 is a side view showing the locking mechanism in the operative position and the ratcheting pawl in the inoperative position.

Referring particularly to FIGURE 1, there is shown a first locking member 10 which is pivotally supported within a frame 12 by means of pivot pin 14. Locking member 10 is biased toward the operating position by means of springs 16 and 18 which are located about the extremities of pivot pin 14. A second locking member 20 is pivotally supported within frame 12 by means of pivot pin 22. Locking member 20 includes camming surfaces 24 which contact projections 26 of locking member 10. Second locking member 20 is normally biased to the operative position by arm 28 of spring 30. With the locking members 10 and 20 in the inoperative position, the combined biasing force of springs 14, 16 and 30 is not sufficient to move the locking members 10 and 20 to the operative position. However, only a small amount of manual force is needed to displace the locking members 10 and 20 to the operative position.

To move the locking members 10 and 20 to the operative position, it is necessary to rotate locking member 10 approximately one hundred and thirty-five degrees. With locking member 10 in the rotated position, locking member 20 rotates in the same direction as locking member 10 approximately forty-five degrees and is stopped from further movement by locking member 10. In this manner a cooperative locking assembly is achieved which does not permit transverse movement thereupon by means of a load supporting element 32. It is to be remembered that the specific apparatus comprising applicant's invention is not confined to the locking assembly as hereinbefore described. This assembly is described merely for environmental reasons. A more detailed explanation of the operation of such a locking assembly can be acquired from U.S. Patent No. 3,210,038 entitled Cargo Latch, by H. E. Bader et al.

The specific device of applicant's invention comprises a restraint latch 34 which is confined between the leg portions 35 and 37 of locking member 20. Restraint latch 34 is pivotally mounted upon pivot rod 14 with pivot rod 22 extending through a portion of latch 34 confining the movement thereof through slot 36. Restraint latch 34 is capable of assuming an inoperative position in which the head portion 38 does not extend above the plane of the cargo floor. Restraint latch 34 is normally biased to the operative position by means of arm 40 of spring 30. Restraint latch 34 can be ratcheted downward to the inoperative position upon contaction of load supporting element 32 which surface 42 of restraint latch 34. When the restraint latch 34 is in the operative position and the load supporting element contacts head portion 38, restraint latch 34 does not ratchet to the inoperative position but functions to prevent further movement of load supporting element 32.

At times it may be desirable to lock the restraint latch 34 in the inoperative position. This can be accomplished by means of manually moving restraint latch 34 a small distance below the plane of the cargo floor until stop 44 has sufficient clearance to move beneath a section of the leg portion 37 of locking member 20. This slight transverse movement is automatically accomplished by spring 46 once the clearance is achieved between stop 44 and leg portion 37. To move restraint latch 34 from this locked position it is necessary to exert a manual transverse force against the action of spring 46 until sufficient vertical clearance for stop 44 is achieved. Thereupon, latch 34 will be biased to the operative position.

Although the particular restraint latch of this invention has been described in conjunction with a specific embodiment of a latching assembly, it is to be apparent that the restraint latch of this invention could be combined with other types of latching assemblies. Therefore, it is desired to emphasize the fact that many variations may be resorted to without departing from the scope of this invention.

What I claim is:
1. A cargo restraining system comprising:
   a frame;
   a pair of locking members pivotally mounted on said frame and positioned for pivotal interengagement with each other, said locking members being movable between an erected position and a retracted position, upon erection each of said locking members being capable of retaining movable load supporting elements against movement in a direction toward said frame;
   abutment means carried by each of said locking members, said abutment means being adapted for engagement with each other upon erection of said locking members;
   biasing means coupled to said locking members for biasing said locking members to the erected position and for maintaining the engagement of said abutment means;
   a pawl pivotally mounted on said frame, said pawl occupying an inoperative position when said locking members are placed in the erected position and being capable of occupying an operative position when said locking members are placed in the retracted position;
   biasing means coupled to said pawl for continuously biasing said pawl to the operative position; and
   limiting means coupled to said pawl for limiting the movement of said pawl when it is placed in the operative position, thereby permitting passage in one direction of the cargo load supporting element and preventing passage in the opposite direction.

2. The apparatus as defined in claim 1 further comprising:
   means for maintaining said pawl in the inoperative position.

References Cited

UNITED STATES PATENTS

| | | | |
|---|---|---|---|
| 2,623,759 | 12/1952 | Forbas | 188—32 X |
| 3,233,761 | 2/1966 | McCartney et al. | 214—84 |
| 3,262,588 | 7/1966 | Davidson | 214—84 |
| 3,399,921 | 9/1968 | Trost et al. | 105—366 X |

ALBERT J. MAKAY, Primary Examiner

U.S. Cl. X.R.

105—366; 188—32